(12) United States Patent
Yaguchi et al.

(10) Patent No.: US 9,458,774 B2
(45) Date of Patent: Oct. 4, 2016

(54) ABNORMAL COMBUSTION SUPPRESSION CONTROL APPARATUS FOR INTERNAL COMBUSTION ENGINE

(75) Inventors: Hiroshi Yaguchi, Susono (JP); Motoichi Murakami, Gotemba (JP); Daisaku Ozaki, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 357 days.

(21) Appl. No.: 14/118,621

(22) PCT Filed: Jul. 11, 2011

(86) PCT No.: PCT/JP2011/065805
§ 371 (c)(1),
(2), (4) Date: Nov. 19, 2013

(87) PCT Pub. No.: WO2013/008296
PCT Pub. Date: Jan. 17, 2013

(65) Prior Publication Data
US 2014/0088852 A1    Mar. 27, 2014

(51) Int. Cl.
*G06F 7/00* (2006.01)
*G06F 17/00* (2006.01)
(Continued)

(52) U.S. Cl.
CPC ............. *F02D 35/02* (2013.01); *F02D 35/023* (2013.01); *F02D 41/1498* (2013.01); *F02D 41/22* (2013.01); *F02D 2041/227* (2013.01); *F02D 2200/1015* (2013.01); *Y02T 10/40* (2013.01)

(58) Field of Classification Search
CPC .. F02D 35/023; F02D 41/1498; F02D 41/22; G01M 15/08

USPC ............. 701/111; 73/35.04; 123/406.34, 435
See application file for complete search history.

(56) References Cited

U.S. PATENT DOCUMENTS 4,542,727 A * 9/1985 Britsch ................... F02P 5/152
                                                   123/406.3
4,622,939 A * 11/1986 Matekunas ........... F02D 35/023
                                                   123/406.41
(Continued)

FOREIGN PATENT DOCUMENTS

JP        3-57878 A      3/1991
JP        2002-276404 A  9/2002
(Continued)

OTHER PUBLICATIONS

International Search Report of PCT/JP2011/065805, dated Aug. 2, 2011.

*Primary Examiner* — Mahmoud Gimie
*Assistant Examiner* — David Hamaoui
(74) *Attorney, Agent, or Firm* — Sughrue Mion, PLLC

(57) ABSTRACT

Provided is a control apparatus for an internal combustion engine which can favorably achieve a good balance between the prevention of an excessive increase in the piston temperature and the prevention of deterioration of various performances of the internal combustion engine as a result of execution of abnormal combustion suppression control, even when abnormal combustion occurs continuously or substantially continuously over a plurality of cycles. An in-cylinder pressure sensor (34) is provided to obtain the in-cylinder pressure P of an internal combustion engine (10). When continuous pre-ignition is detected using the in-cylinder pressure sensor (34), the control apparatus makes it more difficult for continuous pre-ignition suppression control to be executed when the Pmax at the time of pre-ignition is low than when the Pmax at the time of pre-ignition is high.

4 Claims, 7 Drawing Sheets

| Pmax at pre-ignition [MPa] | Temp increase rate ΔT[°C/number of times] | Continuous pre-ignition allowable number n [number of times] |
|---|---|---|
| Pmax_1 | ΔT_1 | n_1 |
| Pmax_2 | ΔT_2 | n_2 |
| Pmax_3 | ΔT_3 | n_3 |

(51) Int. Cl.
*F02D 35/02* (2006.01)
*F02D 41/14* (2006.01)
*F02D 41/22* (2006.01)

(56) References Cited

U.S. PATENT DOCUMENTS

| | | | | |
|---|---|---|---|---|
| 6,880,381 B2 * | 4/2005 | Fukuoka | ............... | G01L 23/225 701/111 |
| 7,178,503 B1 * | 2/2007 | Brehob | ................ | F02D 35/027 123/304 |
| 2003/0188714 A1 * | 10/2003 | Yamamoto | ............ | F02D 35/023 73/114.09 |
| 2015/0204249 A1 * | 7/2015 | Glugla | .................. | F02B 37/168 123/90.15 |

FOREIGN PATENT DOCUMENTS

| | | |
|---|---|---|
| JP | 2003-176751 A | 6/2003 |
| JP | 2007-231903 A | 9/2007 |
| JP | 2009-115041 A | 5/2009 |
| JP | 2010-84739 A | 4/2010 |
| WO | 02/079629 A1 | 10/2002 |

* cited by examiner

Fig. 4
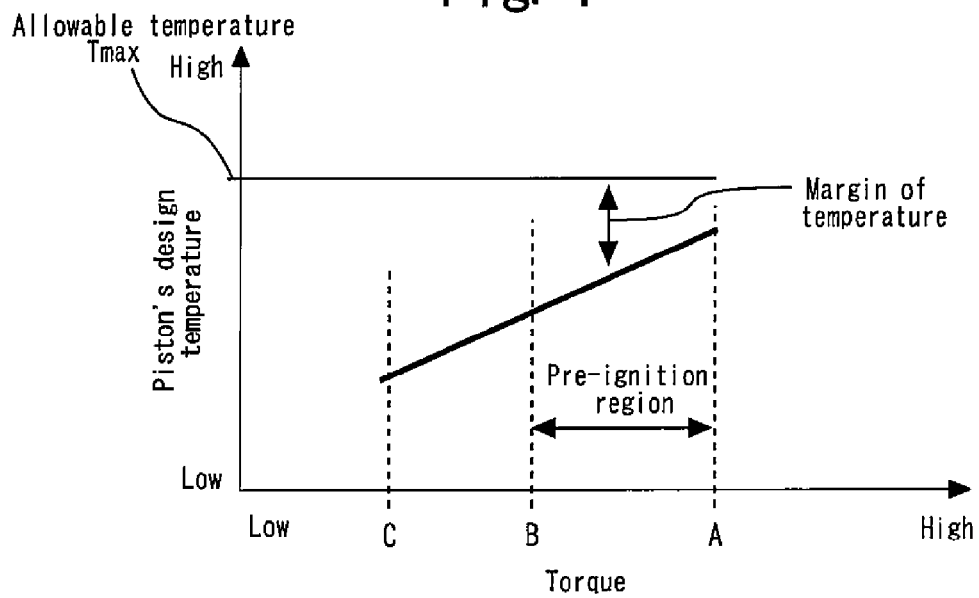
Fig. 5
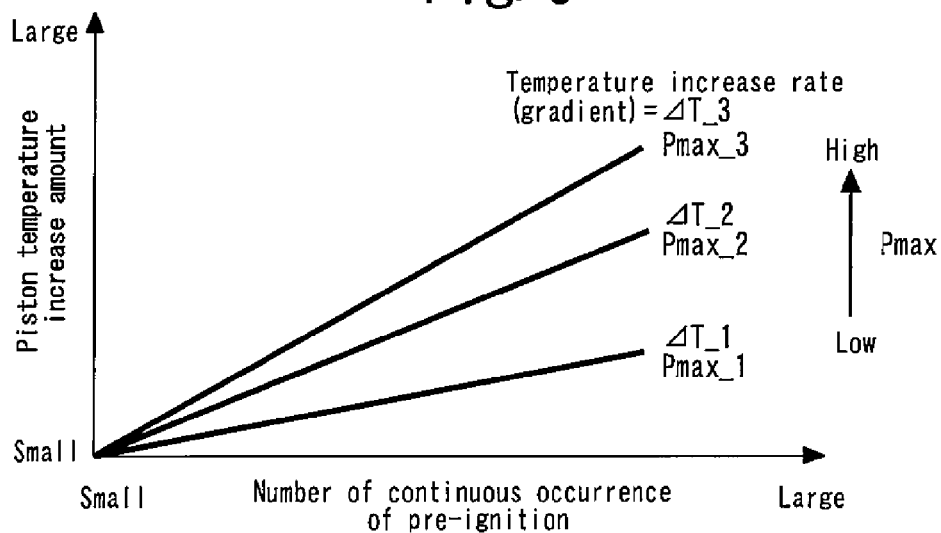
Fig. 6
| Pmax at pre-ignition [MPa] | Temp increase rate ΔT [°C/ number of times] | Continuous pre-ignition allowable number n [number of times] |
|---|---|---|
| Pmax_1 | ΔT_1 | n_1 |
| Pmax_2 | ΔT_2 | n_2 |
| Pmax_3 | ΔT_3 | n_3 |

116: Is continuous pre-ignition suppression control in execution?

200: Count number of continuous occurrence of pre-ignition for every predetermined Pmax at pre-ignition 202: Has number of continuous occurrence of pre-ignition under Pmax at any of pre-ignitions reached continuous pre-ignition allowable number n?

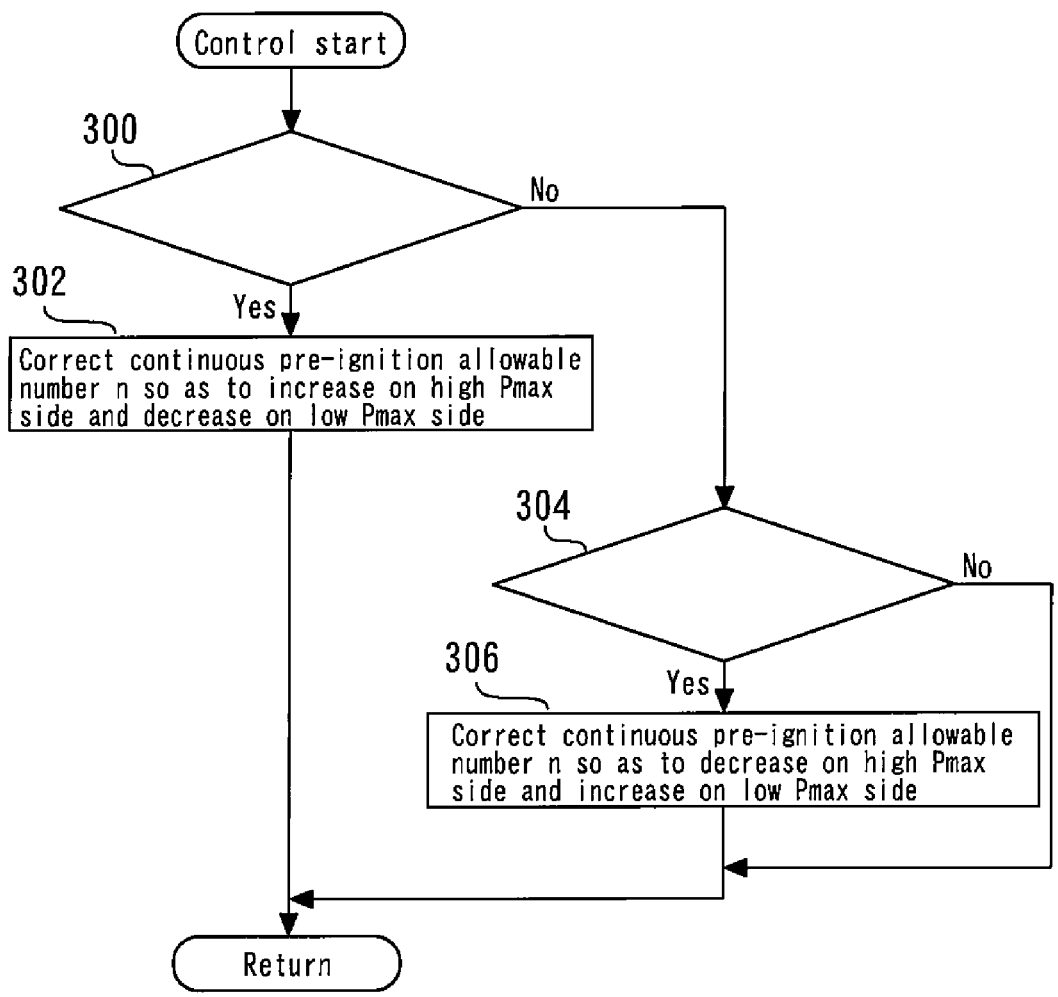

ABNORMAL COMBUSTION SUPPRESSION CONTROL APPARATUS FOR INTERNAL COMBUSTION ENGINE

CROSS REFERENCE TO RELATED APPLICATIONS

This application is a National Stage of International Application No. PCT/JP2011/065805 filed Jul. 11, 2011, the contents of all of which are incorporated herein by reference in their entirety.

TECHNICAL FIELD

This invention relates to a control apparatus for an internal combustion engine.

BACKGROUND ART

So far, for example, Patent Document 1 discloses a combustion control apparatus for an internal combustion engine. This conventional combustion control apparatus detects abnormal combustion (pre-ignition) on the basis of the output of in-cylinder pressure for detecting the in-cylinder pressure. Further, when a pre-ignition is detected, retard of ignition timing or enrichment of an air fuel ratio is performed in order to suppress the pre-ignition.

Including the above described document, the applicant is aware of the following documents as related art of the present invention.

CITATION LIST

Patent Documents

Patent Document 1: Japanese Laid-open Patent Application Publication No. 3-57878
Patent Document 2: Japanese Laid-open Patent Application Publication No. 2009-115041
Patent Document 3: Japanese Laid-open Patent Application Publication No. 2003-176751

SUMMARY OF INVENTION

Technical Problem

If an abnormal combustion (pre-ignition) occurs continuously or substantially continuously over a plurality of cycles, the temperature of a piston increases. When, as a result, the temperature of the piston excessively increases, it becomes difficult for the strength of the piston to continue to be guaranteed. On the other hand, at the time of occurrence of abnormal combustion, the temperature of the piston can be prevented from increasing by executing control for suppressing abnormal combustion (such as, retard of ignition timing, enrichment of air fuel ratio, or fuel cut) as in the technique disclosed in Patent Document 1 described above. However, if such abnormal combustion suppression control is executed, there is a concern that various performances of an internal combustion engine (such as, output power, suppression of exhaust gas emission, fuel consumption, or securement of drivability) may be deteriorated.

There is an opposing relation between an in-cylinder pressure value at the time of occurrence of abnormal combustion and the occurrence frequency of abnormal combustion. Further, it can be said that even if abnormal combustion occurs with a high frequency, the temperature of the piston is hard to increase in a case in which the maximum in-cylinder pressure value at the time of abnormal combustion is low, as compared with a case in which it is high. Therefore, there is room to be able to suppress the deterioration of the aforementioned various performances of the internal combustion engine that have a tradeoff relation with suppression of abnormal combustion while preventing an increase in the temperature of the piston, provided that execution of abnormal combustion suppression control is adjusted in accordance with the magnitude of the maximum in-cylinder pressure value at the time of occurrence of abnormal combustion.

The present invention has been made to solve the problem as described above, and has its object to provide a control apparatus for an internal combustion engine which can favorably achieve a good balance between the prevention of an excessive increase in the piston temperature and the prevention of deterioration of various performances of the internal combustion engine as a result of execution of abnormal combustion suppression control, even when abnormal combustion occurs continuously or substantially continuously over a plurality of cycles.

Solution to Problem

A first aspect of the present invention is a control apparatus for an internal combustion engine, comprising:
in-cylinder pressure obtaining means for obtaining in-cylinder pressure of an internal combustion engine;
abnormal combustion detection means for detecting presence or absence of abnormal combustion on a basis of the in-cylinder pressure obtained by the in-cylinder pressure obtaining means; and
abnormality combustion suppression control adjusting means for, when continuous or substantially continuous abnormal combustion is detected, making it more difficult for abnormal combustion suppression control which suppresses abnormal combustion to be executed when a maximum in-cylinder pressure value at a time of occurrence of abnormal combustion is low than when the maximum in-cylinder pressure value at the time of occurrence of abnormal combustion is high.

A second aspect of the present invention is the control apparatus for an internal combustion engine according to the first aspect of the present invention,
wherein the abnormal combustion suppression control adjusting means includes piston temperature increase amount estimating means for estimating a piston temperature increase amount due to occurrence of abnormal combustion, on a basis of a product of a piston temperature increase rate that is set so as to increase with a increase in the maximum in-cylinder pressure value at the time of occurrence of abnormal combustion and an occurrence number of abnormal combustion, and
wherein when continuous or substantially continuous abnormal combustion is detected, the abnormal combustion suppression control adjusting means adjusts execution of the abnormal combustion suppression control so that a piston temperature calculated on a basis of the piston temperature increase amount estimated by the piston temperature increase amount estimating means becomes lower than a predetermined allowable temperature.

A third aspect of the present invention is the control apparatus for an internal combustion engine according to the first aspect of the present invention,
wherein the abnormal combustion suppression control adjusting means executes the abnormal combustion suppression control in a case in which an occurrence number of abnormal combustion when continuous or substantially continuous abnormal combustion is detected has reached a predetermined abnormal combustion allowable number, wherein the abnormal combustion allowable number differs according to the maximum in-cylinder pressure value at the time of occurrence of abnormal combustion, and when the abnormal combustion allowable number that is used when the maximum in-cylinder pressure value at the time of occurrence of abnormal combustion is low is larger than the abnormal combustion allowable number that is used when the maximum in-cylinder pressure value at the time of occurrence of abnormal combustion is high.

A fourth aspect of the present invention is the control apparatus for an internal combustion engine according to the third aspect of the present invention, further comprising first abnormal-combustion-allowable number changing means for, when an occurrence frequency of abnormal combustion is obtained for every maximum in-cylinder pressure value with respect to at least two maximum in-cylinder pressure values during operation of the internal combustion engine, increasing the abnormal combustion allowable number for a certain maximum in-cylinder pressure value while decreasing the abnormal combustion allowable number for another at least one maximum in-cylinder pressure value in a case in which the occurrence frequency of abnormal combustion at the certain maximum in-cylinder pressure value is higher than or equal to a first predetermined value.

A fifth aspect of the present invention is the control apparatus for an internal combustion engine according to the third or fourth aspect of the present invention, further comprising second abnormal-combustion-allowable number changing means for, when an occurrence frequency of abnormal combustion is obtained for every maximum in-cylinder pressure value with respect to at least two maximum in-cylinder pressure values during operation of the internal combustion engine, decreasing the abnormal combustion allowable number for a certain maximum in-cylinder pressure value while increasing the abnormal combustion allowable number for another at least one maximum in-cylinder pressure value in a case in which the occurrence frequency of abnormal combustion at the certain maximum in-cylinder pressure value is lower than a second predetermined value.

Advantageous Effects of Invention

According to the first aspect of the present invention, the abnormal combustion suppression control becomes more easy to be executed when the maximum in-cylinder pressure value at the time of occurrence of abnormal combustion is high (when the temperature of a piston is relatively likely to increase as compared with when the maximum in-cylinder pressure value is low) than when the maximum in-cylinder pressure value is low. As a result of this, the temperature of the piston can be favorably prevented from excessively increasing at the time of occurrence of abnormal combustion under a situation in which the maximum in-cylinder pressure value is high. On the other hand, the abnormal combustion suppression control becomes more difficult to be executed when the maximum in-cylinder pressure value at the time of occurrence of abnormal combustion is low (when the occurrence frequency of abnormal combustion becomes higher than that when the maximum in-cylinder pressure value is high) than when the maximum in-cylinder pressure value is high. Therefore, in a situation in which the maximum in-cylinder pressure value is low, various performances (such as, exhaust emission performance) of the internal combustion engine can be prevented from being deteriorated as a result of frequent execution of the abnormal combustion suppression control. As just described, the present invention can favorably achieve a good balance between the prevention of an excessive increase in the piston temperature and the prevention of deterioration of various performances of the internal combustion engine as a result of execution of abnormal combustion suppression control, even when abnormal combustion occurs continuously or substantially continuously over a plurality of cycles.

According to the second aspect of the present invention, the temperature increase amount is estimated as a lower value when abnormal combustion occurs continuously or substantially continuously in a situation in which the maximum in-cylinder pressure value at the time of occurrence of abnormal combustion is low than when abnormal combustion occurs continuously or substantially continuously in a situation in which the maximum in-cylinder pressure value at the time of occurrence of abnormal combustion is high. Because of this, the number of abnormal combustion that is allowed until the abnormal combustion suppression control is executed becomes larger in a case in which the maximum in-cylinder pressure at the time of occurrence of abnormal combustion is low, as compared with a case in which it is high. That is to say, when continuous or substantially continuous abnormal combustion is detected, the present invention can make it more difficult for the abnormal combustion suppression control to be executed when the maximum in-cylinder pressure value at the time of occurrence of abnormal combustion is low than when it is high. Furthermore, the present invention can provide accurate temperature control for the piston, regardless of the magnitude of the individual maximum in-cylinder pressure values when continuous or substantially continuous abnormal combustion is detected.

According to the third aspect of the present invention, when abnormal combustion occurs continuously or substantially continuously, the abnormal combustion suppression control is executed only if the occurrence number of abnormal combustion under the maximum in-cylinder pressure value at the time of any of occurrences of the abnormal combustion has reached the abnormal combustion allowable number that is set for every maximum in-cylinder pressure value at the time of occurrence of abnormal combustion. Furthermore, in the present invention, the abnormal combustion allowable number that is used when the maximum in-cylinder pressure value at the time of occurrence of the abnormal combustion is low is made larger than the abnormal combustion allowable number that is used when the maximum in-cylinder pressure value at the time of occurrence of the abnormal combustion is high. Therefore, when continuous or substantially continuous abnormal combustion is detected, the present invention can also make it more difficult for the abnormal combustion suppression control to be executed when the maximum in-cylinder pressure value at the time of occurrence of abnormal combustion is low than when it is high.

According to the fourth aspect of the present invention, when the occurrence frequency of abnormal combustion at a certain maximum in-cylinder pressure value is higher than or equal to the first predetermined value, the processing is executed to increase the abnormal combustion allowable number for the certain maximum in-cylinder pressure value while decreasing the abnormal combustion allowable number for another at least one maximum in-cylinder pressure value. This makes is possible, even when the occurrence frequency of abnormal combustion under a particular maximum in-cylinder pressure value increases during operation of the internal combustion engine, to achieve a good balance on the whole so that fatigue cumulatively accumulated in the piston does not increase as a result of continuous or substantially continuous occurrence of abnormal combustion, while suppressing frequent execution of the abnormal combustion suppression control in response to occurrence of abnormal combustion under the particular maximum in-cylinder pressure value under which the occurrence frequency has increased. As a result of this, even when it is assumed that continuous or substantially continuous abnormal combustion will occur, the piston strength can be favorably secured without accompanying an increase in the piston weight for increasing the strength of the piston itself.

According to the fifth aspect of the present invention, when the occurrence frequency of abnormal combustion at a certain maximum in-cylinder pressure value is lower than the second predetermined value, the processing is executed to decrease the abnormal combustion allowable number for the certain maximum in-cylinder pressure value while increasing the abnormal combustion allowable number for another at least one maximum in-cylinder pressure value. This makes is possible, even when the occurrence frequency of abnormal combustion under a particular maximum in-cylinder pressure value decreases during operation of the internal combustion engine, to achieve a good balance on the whole so that fatigue cumulatively accumulated in the piston does not increase as a result of continuous or substantially continuous occurrence of abnormal combustion, while further suppressing frequent execution of the abnormal combustion suppression control under another at least one maximum in-cylinder pressure value.

BRIEF DESCRIPTION OF DRAWINGS

FIG. 4 is a diagram showing a relation between piston's design temperature and torque of the internal combustion engine;

FIG. 5 is a diagram representing the tendency of temperature increase of a piston with the relation between the number of continuous occurrence of pre-ignition and the maximum in-cylinder pressure Pmax;

FIG. 6 is a diagram representing the relation among the maximum in-cylinder pressure Pmax at the time of occurrence of pre-ignition, a temperature increase rate ΔT and a continuous pre-ignition allowable number n;

FIG. 11 is a flowchart representing a routine for implementing the learning control of the continuous pre-ignition allowable number n.

DESCRIPTION OF EMBODIMENTS

First Embodiment

System Configuration of First Embodiment

Figure 1:
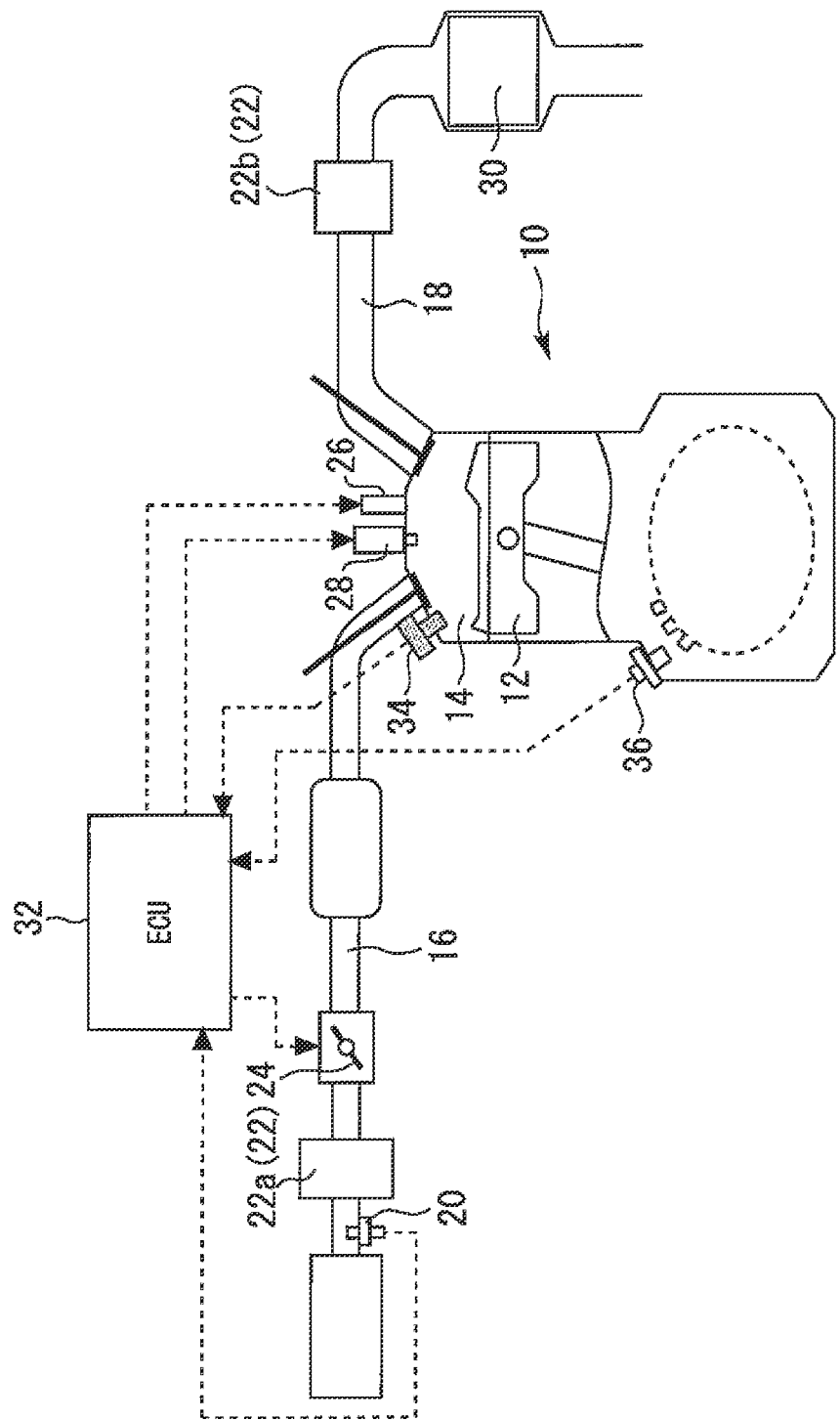
FIG. 1 is a diagram for explaining a system configuration of an internal combustion engine according to a first embodiment of the present invention.

FIG. 1 is a diagram for explaining a system configuration of an internal combustion engine 10 according to a first embodiment of the present invention.

The system shown in FIG. 1 includes an internal combustion engine 10. A piston 12 is provided in a cylinder of the internal combustion engine 10. A combustion chamber 14 is formed on the top side of the piston 12 in the cylinder. There are an intake passage 16 and an exhaust passage 18 in communication with the combustion chamber 14.

An air flow meter 20 that outputs a signal corresponding to the flow rate of air sucked into the intake passage 16 is provided in the vicinity of an inlet of the intake passage 16. A compressor 22a of a turbo supercharger 22 is disposed in the intake passage 16 on the downstream side of the air flow meter 20. Further, an electronically controlled throttle valve 24 is installed in the intake passage 16 on the downstream side of the compressor 22a.

There are installed for each cylinder of the internal combustion engine 10, a fuel injection nozzle 26 for directly injecting fuel into the combustion chamber 14 (cylinder) and a spark plug 28 for igniting air fuel mixture. Further, a turbine 22b of the turbo supercharger 22 is disposed in the exhaust passage 18. A catalyst 30 for purifying exhaust gas is disposed in the exhaust passage 18 on the downstream side of the turbine 22b.

In addition, the system shown in FIG. 1 includes an ECU (Electronic Control Unit) 32. There are connected to an input part of the ECU 32, various types of sensors for detecting the operational state of the internal combustion engine 10, such as an in-cylinder pressure sensor 34 for detecting an in-cylinder pressure P, and a crank angle sensor 36 for detecting an engine revolution speed, as well as the air flow meter 20 described above. In addition, there are connected to an output part of the ECU 32, various types of actuators for controlling the operation of the internal combustion engine 10, such as the throttle valve 24, the fuel injection nozzle 26 and the spark plug 28 that are described above. The ECU 32 controls the operational state of the internal combustion engine 10 by actuating the various types of actuators on the basis of the output of each sensor and predetermined programs.

Figure 2:
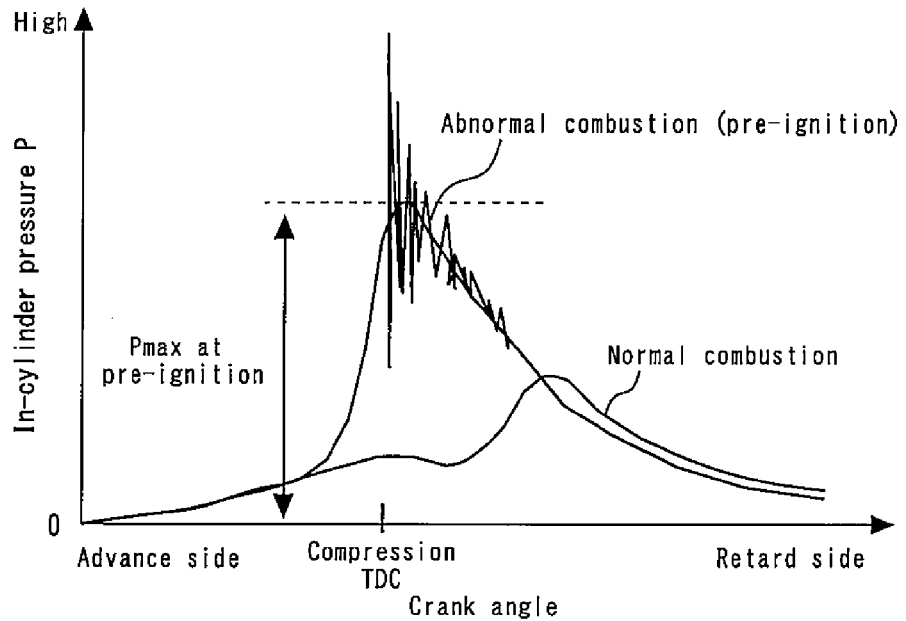
FIG. 2 is a Pθ diagram showing each of in-cylinder pressure waveforms at the time of usual (normal) combustion and at the time of occurrence of pre-ignition.

Guarantee of Piston Strength with Taking into Account Occurrence of Pre-Ignition FIG. 2 is a Pθ diagram showing each of in-cylinder pressure waveforms at the time of usual (normal) combustion and at the time of occurrence of pre-ignition.

FIG. 2 shows a change in in-cylinder pressure P during the compression stroke and the expansion stroke. As shown in FIG. 2, when a pre-ignition (hereinafter, simply abbreviated as a "PREIG") as abnormal combustion has occurred, the in-cylinder pressure P rapidly rises at an earlier timing compared with a case of normal combustion. As a result of this, when a PREIG has occurred, the maximum in-cylinder pressure value during one cycle (hereinafter, basically referred to as a "maximum in-cylinder pressure Pmax")

shows a value higher than that at the time of normal combustion. In this connection, the maximum value in trajectory of center value of fluctuation in the in-cylinder pressure P at the time of occurrence of PREIG is used as the maximum in-cylinder pressure Pmax.

Figure 3:
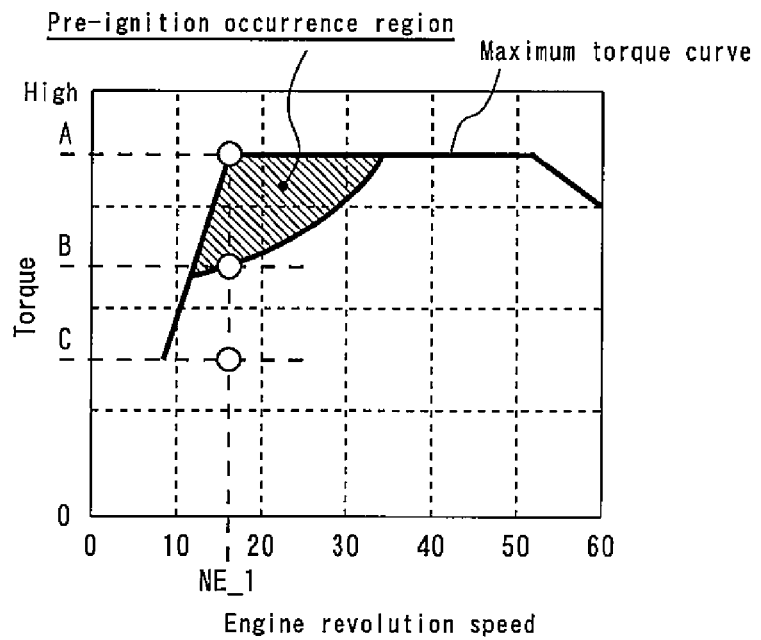
FIG. 3 is a diagram showing an operational region in which pre-ignition occurs.

FIG. 3 is a diagram showing an operational region in which pre-ignition occurs. In addition, FIG. 4 is a diagram showing a relation between piston's design temperature and torque of the internal combustion engine 10. Incidentally, torque values A to C in FIG. 4 correspond to the torque values at the engine speed NE_1 in FIG. 3.

As shown in FIG. 3, a low-revolution-speed and high-load (torque) region of the internal combustion engine 10 is an operational region (pre-ignition occurrence region) in which pre-ignition is likely to occur. The temperature of the piston 12 increases with an increase in load (torque). Because of this, as shown in FIG. 4, the piston's design temperature (more specifically, a design temperature at a representative part (for example, top part)) is set (assumed) so as to increase with an increase in torque. In addition, as shown in FIG. 4, a piston allowable temperature Tmax for guaranteeing a predetermined piston strength is set as a value with a margin with respect to the piston design's temperature while also taking into consideration an occurrence of pre-ignition.

FIG. 5 is a diagram representing the tendency of temperature increase of the piston 12 with the relation between the number of continuous occurrence of pre-ignition and the maximum in-cylinder pressure Pmax.

When a pre-ignition occurs, the temperature of the piston 12 increases. If the pre-ignition that has occurred is singly, the temperature of the piston 12 will promptly return to the original value even if it increases. However, if the pre-ignition has occurred continuously, the temperature of the piston 12 will continue to increase. More specifically, as shown in FIG. 5, the temperature of the piston 12 becomes higher as the number of continuous pre-ignition increases. In addition, the temperature increase rate ΔT of the piston 12 increases as the maximum in-cylinder pressure Pmax at the time of occurrence of pre-ignition (hereinafter, simply abbreviated as a "Pmax at the time of pre-ignition") is higher. In this connection, the continuous pre-ignition herein corresponds to a pre-ignition that continuously occurs over a plurality of cycles in the same cylinder. Moreover, the Pmax at the time of pre-ignition corresponds to the maximum value of the in-cylinder pressure during a cycle in which a pre-ignition has occurred.

The pre-ignition occurrence region (FIG. 3) corresponds to a high-load region. Therefore, in a case in which the pre-ignition occurrence region is continuously used, the temperature of the piston 12 is likely to become high originally. If the pre-ignition continuously occurs in such case (especially, if the occurrence frequency of pre-ignition increases at a condition in which the maximum in-cylinder pressure Pmax is high increases), the temperature of the piston 12 increases in excess of a predetermined piston allowable temperature Tmax and therefore, there is a concern that the strength of the piston may be difficult to be guaranteed.

Accordingly, in order to prevent a rapid increase in temperature of the piston 12 due to a continuous occurrence of pre-ignition, it is conceivable to execute continuous pre-ignition suppression control (for example, enrichment of air fuel ratio, or fuel cut) for suppressing (resolving) the continuous pre-ignition. However, if a continuous pre-ignition frequently occurs at a particular operational condition in the pre-ignition occurrence region and the enrichment of air fuel ratio is frequently executed as the continuous pre-ignition suppression control, there is a concern that exhaust emission may be deteriorated. In addition, if fuel cut is frequently executed as the continuous pre-ignition suppression control, there is a concern that the drivability of the internal combustion engine 10 may be deteriorated.

On the other hand, in order to sufficiently guarantee the piston strength without relying on the continuous pre-ignition suppression control described above in a situation in which an occurrence of a continuous pre-ignition is assumed, it is conceivable to design the strength of the piston itself with the intention of increasing it sufficiently (excessively). If, however, such design has done, an increase in weight of the piston due to an increase in thickness of the piston becomes a problem. Furthermore, if it is assumed that an identical internal combustion engine is used in some places of destination or for some types of vehicle, there is a possibility that when the occurrence frequency of pre-ignition at a condition in which the Pmax at the time of pre-ignition is high varies due to the difference in the place of destination or the type of vehicle, the piston is required to be changed in accordance with the place of destination or the type of vehicle. Doing so creates disadvantage in communalization of parts of an internal combustion engine.

Figure 7:
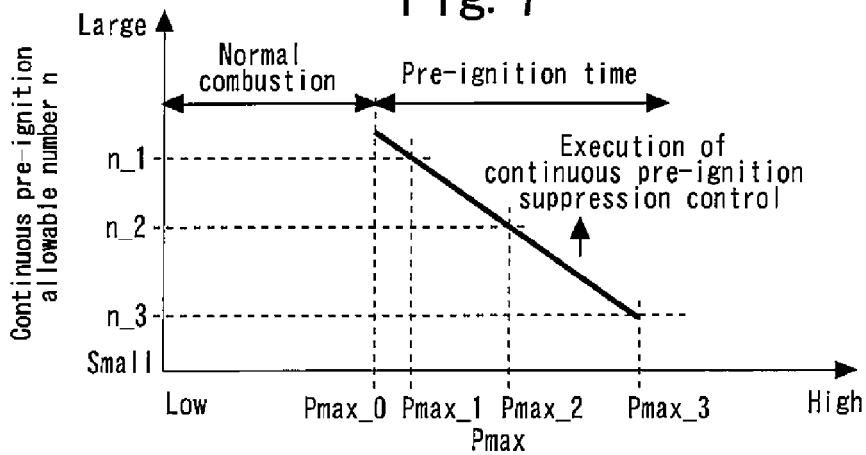
FIG. 7 is a diagram representing the tendency of a change in the continuous pre-ignition allowable number n with respect to a change in the maximum in-cylinder pressure Pmax at the time of occurrence of pre-ignition.

FIG. 6 is a diagram representing the relation among the maximum in-cylinder pressure Pmax at the time of occurrence of pre-ignition, the temperature increase rate ΔT and a continuous pre-ignition allowable number n. In addition, FIG. 7 is a diagram representing the tendency of a change in the continuous pre-ignition allowable number n with respect to a change in the maximum in-cylinder pressure Pmax at the time of occurrence of pre-ignition. The relations in FIGS. 6 and 7 correspond to, as one example, a situation in which the engine revolution speed is a predetermined value NE_1 appearing on above described FIG. 3 and the torque is a predetermined value A appearing on the same figure.

In the present embodiment, as shown in FIG. 5, it is assumed that the temperature increase rate ΔT of the piston 12 as a result of an occurrence of one pre-ignition with an increases in the Pmax at the time of pre-ignition. In addition, as shown in FIG. 6, the temperature increase rate ΔT and the continuous pre-ignition allowable number n are defined in accordance with the magnitude of the Pmax at the time of pre-ignition. Specifically, the continuous pre-ignition allowable number n is a value that is classified as the number of continuous occurrence of pre-ignition that is allowed under the temperature increase rate ΔT based on the Pmax at the time of pre-ignition, with respect to a temperature margin to reach a predetermined piston allowable temperature Tmax for guaranteeing the piston strength. The temperature increase rate ΔT becomes higher as the Pmax at the time of pre-ignition is higher, and therefore, under the same condition, the continuous pre-ignition allowable number n becomes smaller as the Pmax at the time of pre-ignition is higher. Because of this, as shown in FIG. 7, the continuous pre-ignition allowable number n becomes larger as the Pmax at the time of pre-ignition is lower.

Concrete Processing in First Embodiment

Accordingly, in order to favorably perform temperature management of the piston 12 in a case of supposing continuous occurrence of pre-ignition without the need of taking special measures such as enhancing the strength of the piston itself, it is desirable to achieve a good balance between the prevention of an increase in the piston temperature T so as not to exceed the piston allowable temperature Tmax as a result of a continuous pre-ignition, and the prevention of deterioration of various performances (the above mentioned exhaust emission performance, securement of the drivability, and the like) of the internal combustion engine 10 as a result of performance of the continuous pre-ignition suppression control.

Thus, in the present embodiment, when a continuous pre-ignition is detected during operation of the internal combustion engine 10, a piston temperature increase amount due to an occurrence of pre-ignition is estimated on the basis of the product of the temperature increase rate $\Delta T$ of the piston 12 and the occurrence number of pre-ignition that are set as shown in above described FIG. 5. Further, the continuous pre-ignition suppression control is performed when the piston temperature T calculated taking into consideration the above mentioned piston temperature increase amount has reached the piston allowable temperature Tmax.

Figure 8:
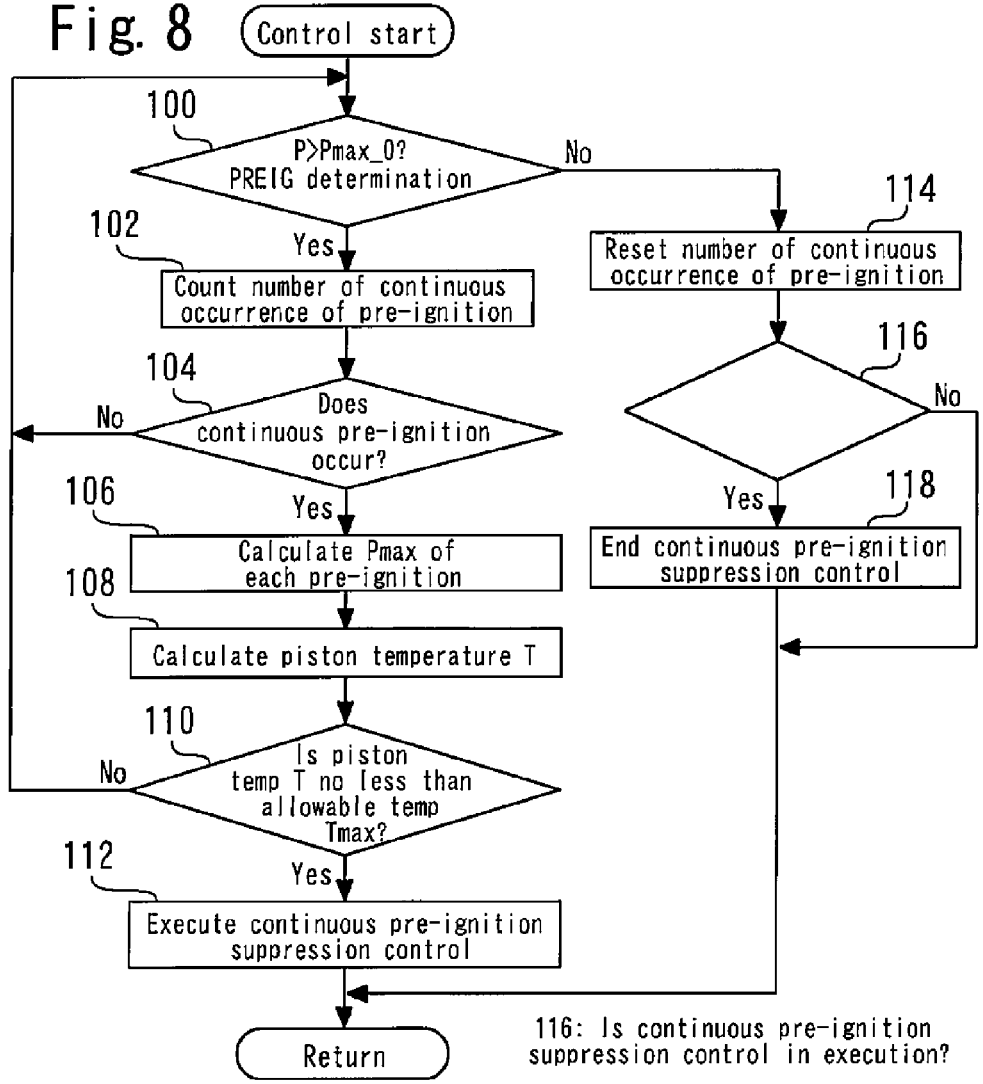
FIG. 8 is a flowchart of a routine that is executed in the first embodiment of the present invention.

FIG. 8 is a flowchart representing a control routine executed by the ECU 32 to implement the control according to the first embodiment of the present invention. The processing of the present routine is supposed to be executed in parallel on a cylinder basis, for every cycles of the internal combustion engine 10.

In the routine shown in FIG. 8, first, pre-ignition determination is performed on the basis of whether or not the in-cylinder pressure P detected using the in-cylinder pressure sensor 34 is higher than the maximum in-cylinder pressure Pmax_0 at normal combustion (step 100).

If, as a result of that, it is determined in step 100 that a pre-ignition has occurred in the current cycle, the number of continuous occurrence of pre-ignition is counted (step 102). Next, it is determined whether or not the pre-ignition at the current cycle is part of continuous pre-ignition (step 104). Specifically, it is determined whether or not the number of continuous occurrence of pre-ignition is at least two.

If it is determined in step 104 to be in a situation in which a continuous pre-ignition is occurring, each Pmax at the time of pre-ignition of the pre-ignitions occurring continuously is calculated (step 106). Then, the piston temperature T is calculated (step 108). Specifically, the ECU 32 stores the temperature increase rate $\Delta T$ that is set so as to increase with an increase in the Pmax at the time of pre-ignition. In present step 108, a piston temperature increase amount due to an occurrence of the current continuous pre-ignition is calculated as a value obtained by calculating and summing each product of the temperature increase rate $\Delta T$ corresponding to the Pmax at the time of pre-ignition and the occurrence number of pre-ignition, with respect to each pre-ignition that has continuously occurred. In a situation, for example, in which three pre-ignitions have occurred continuously, if the Pmax at the time of first pre-ignition is 6 MPa and the temperature increase rate $\Delta T$ corresponding to this is 5 degrees Celsius per number of times of pre-ignition, if the Pmax at the time of second pre-ignition is 4 MPa and the temperature increase rate $\Delta T$ corresponding to this is 4 degrees Celsius per number of times of pre-ignition, and if the Pmax at the time of third pre-ignition is 6 MPa again, the piston temperature increase amount is calculated as 14 degrees Celsius that is equal to the sum of a value given by multiplying 5 degrees Celsius per number of times of pre-ignition by 2 and a value given by multiplying 4 degrees Celsius per number of times of pre-ignition by 1. Then, the piston temperature T (estimated value) is calculated by adding the calculated piston temperature increase amount to the piston's design temperature (the value stored in the ECU 32 in advance) for the current operational region (which is defined with the torque and the engine revolution speed).

Next, it is determined whether or not the piston temperature T calculated in step 108 is higher than or equal to the piston allowable temperature Tmax (step 110). As a result of this, if the piston temperature T has reached the piston allowable temperature Tmax or more due to the progress of continuous pre-ignition, the continuous pre-ignition suppression control (for example, enrichment of air fuel ratio) is executed (step 112).

If, on the other hand, it is determined in step 100 that no pre-ignition has occurred in the current cycle, the number of continuous occurrence of pre-ignition is reset (step 114). Then, it is determined whether or not the continuous pre-ignition suppression control is in execution (step 116). As a result of this, if the determination of present step 116 is established, that is to say, if no pre-ignition has been detected during execution of the continuous pre-ignition suppression control, the continuous pre-ignition suppression control is ended (step 118).

According to the routine shown in FIG. 8 that has been described so far, the piston temperature T at the time of continuous occurrence of pre-ignition is estimated on the basis of the product of the temperature increase rate $\Delta T$ of the piston 12 that is set so as to be a value different according to the magnitude of the Pmax at the time of pre-ignition and the occurrence number of pre-ignition. Then, the continuous pre-ignition suppression control is performed so that the estimated piston temperature T does not exceed the piston allowable temperature Tmax. Here, there is an opposing relation between the in-cylinder pressure P at the time of occurrence of pre-ignition and the occurrence frequency of pre-ignition. Further, as already described with reference to aforementioned FIG. 5, it can be said that even if pre-ignition occurs with a high frequency, the temperature of the piston is hard to increase in a case in which the Pmax at the time of pre-ignition is low, as compared with a case in which it is high.

According to the method of the above described routine, the temperature increase amount is estimated as a lower value in a case in which pre-ignition has occurred continuously under a situation in which the Pmax at the time of pre-ignition is low, as compared with a case in which pre-ignition has occurred continuously under a situation in which the Pmax at the time of pre-ignition is high. Because of this, the number of continuous occurrence of pre-ignition that is allowed until the continuous pre-ignition suppression control is executed becomes larger in a case in which the Pmax at the time of pre-ignition when pre-ignition has occurred continuously is low, as compared with a case in which it is high. That is to say, when continuous pre-ignition is detected, the aforementioned method can make it more difficult for the continuous pre-ignition suppression control to be executed when the Pmax at the time of pre-ignition is low than when the Pmax at the time of pre-ignition is high.

Consequently, the continuous pre-ignition suppression control is started earlier when the Pmax at the time of pre-ignition is high than when it is low, and thereby, an excessive increase in the piston temperature T can be prevented. In addition, various performances (such as, exhaust emission performance) of the internal combustion engine 10 can be prevented from being deteriorated as a result of frequent execution of the continuous pre-ignition suppression control, at the time of continuous occurrence of pre-ignition in which the Pmax at the time of pre-ignition is low (more specifically, at a situation in which the occurrence frequency of pre-ignition is higher than that when the Pmax at the time of pre-ignition is high).

Moreover, the respective Pmax values at the time of pre-ignition when continuous pre-ignition is occurring are not always equal to one another. According to the method of the aforementioned routine, the temperature increase amount is estimated using the temperature increase rate ΔT corresponding to each Pmax at the time of pre-ignition and the occurrence frequency of each pre-ignition in the pre-ignitions occurring continuously, and the piston temperature T based on the estimated temperature increase amount is compared with the piston allowable temperature Tmax. Therefore, the piston temperature T can be managed accurately.

It is noted that in the first embodiment, which has been described above, the ECU 32 obtains the in-cylinder pressure P using the in-cylinder pressure sensor 34, whereby the "in-cylinder pressure obtaining means" according to the first aspect of the present invention is realized, the ECU 32 performs the aforementioned processing of step 100, whereby the "abnormal combustion detection means" according to the first aspect of the present invention is realized, and the ECU 32 performs a series of the aforementioned processing of steps 102 to 112, whereby the "abnormality combustion suppression control adjusting means" according to the first aspect of the present invention is realized. In addition, the continuous pre-ignition suppression control corresponds to the "abnormal combustion suppression control" according to the first aspect of the present invention.

Furthermore, in the first embodiment, which has been described above, the ECU 32 performs the aforementioned processing of step 108, whereby the "piston temperature increase amount estimating means" according to the second aspect of the present invention is realized.

Second Embodiment

Next, a second embodiment of the present invention will be described with reference to FIGS. 9 to 11.

The system of the present embodiment can be implemented by using the hardware configuration shown in FIG. 1 and making the ECU 32 execute the routines shown in FIGS. 10 and 11 described below, instead of the routine shown in FIG. 8.

In the first embodiment described above, when continuous pre-ignition is detected during operation of the internal combustion engine 10, the piston temperature T is calculated taking into consideration the piston temperature increase amount based on the product of the temperature increase rate ΔT of the piston 12 and the occurrence number of pre-ignition. Furthermore, when the piston temperature T calculated has reached the piston allowable temperature Tmax, the continuous pre-ignition suppression control is executed.

Concrete Processing in Second Embodiment

In contrast, according to the present embodiment, when continuous pre-ignition is detected, the easiness of being executed about the continuous pre-ignition suppression control is managed in accordance with the magnitude of the Pmax at the time of pre-ignition by use of the following method.

Specifically, in the present embodiment, the relation between the continuous pre-ignition allowable number n as shown in aforementioned FIG. 7 and the Pmax at the time of pre-ignition is provided for every predetermined operating point (that is defined by the torque (load) and the engine revolution speed) in the pre-ignition region shown in FIG. 3. In addition, the continuous pre-ignition allowable number n for each operating point is set so as to be larger as the Pmax at the time of pre-ignition is lower.

Furthermore, in the present embodiment, when continuous pre-ignition is detected, the continuous pre-ignition suppression control is executed, provided that the occurrence number of pre-ignition reaches the continuous pre-ignition allowable number n depending on the Pmax at the time of pre-ignition.

Figure 9:
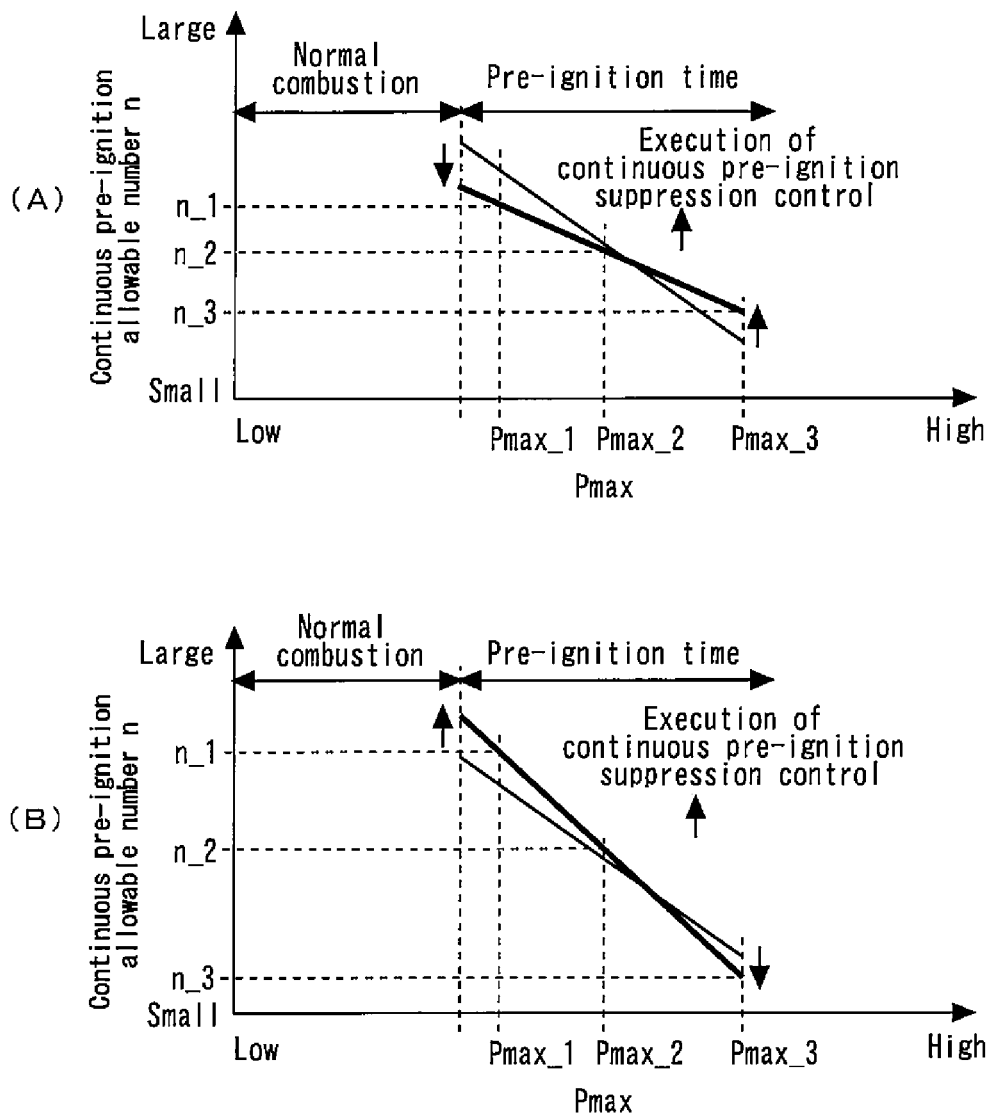
FIG. 9 is a diagram for explaining a learning control of the continuous pre-ignition allowable number n.

FIG. 9 is a diagram for explaining a learning control of the continuous pre-ignition allowable number n.

Moreover, in the present embodiment, the relation between the continuous pre-ignition allowable number n and the Pmax at the time of pre-ignition is changed in accordance with the occurrence number (occurrence frequency) of pre-ignition in a predetermined time period (for example, one month).

Specifically, when the occurrence frequency of pre-ignition in a situation in which the Pmax at the time of pre-ignition is high (for example, the Pmax at the time of pre-ignition is Pmax_3) is higher than or equal to a predetermined value A, the continuous pre-ignition allowable number n (for example, n_3) on the high Pmax side (Pmax_3 side) is increased and the continuous pre-ignition allowable number n (for example, n_1) on the low Pmax side (Pmax_1 side) is decreased, as shown in FIG. 9(A). Conversely, when the occurrence frequency of pre-ignition in a situation in which the Pmax at the time of pre-ignition is high is lower than a predetermined value B (that is smaller than the predetermined value A), the continuous pre-ignition allowable number n (for example, n_3) on the high Pmax side (Pmax_3 side) is decreased and the continuous pre-ignition allowable number n (for example, n_1) on the low Pmax side (Pmax_1 side) is increased, as shown in FIG. 9(B).

Figure 10:
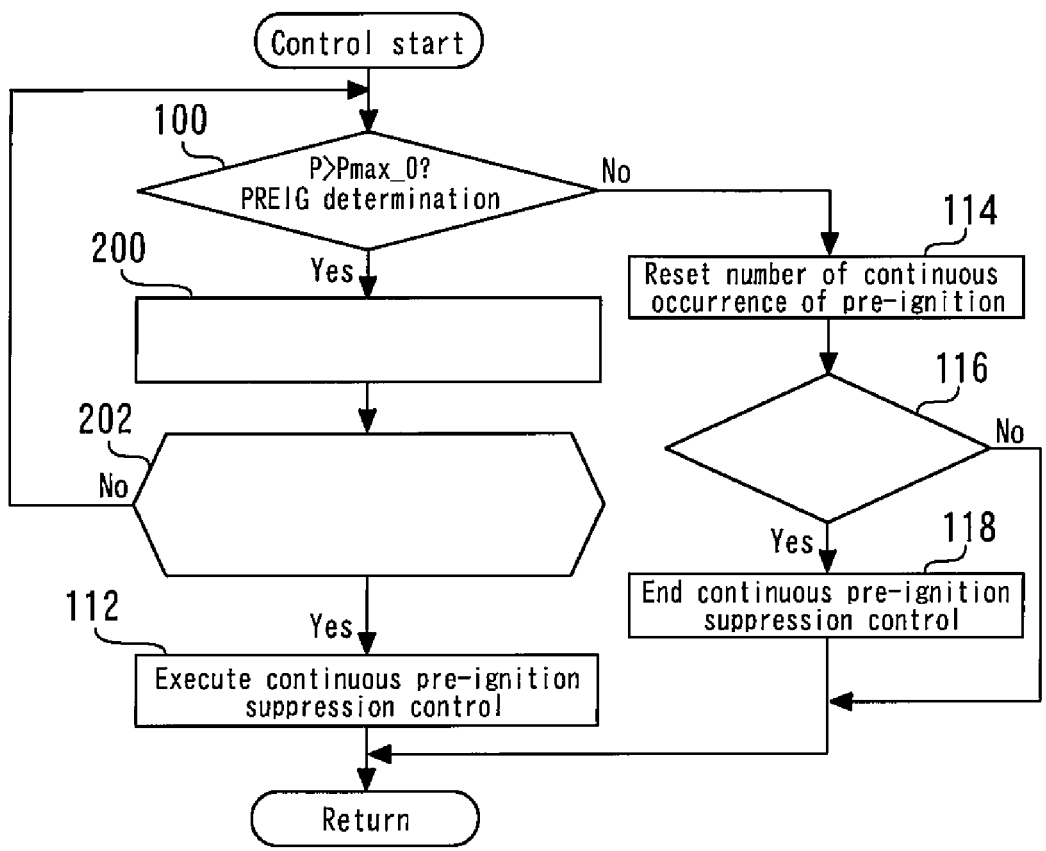
FIG. 10 is a flowchart of a routine that is executed in the first embodiment of the present invention.

FIG. 10 is a flowchart representing a control routine executed by the ECU 32 to implement the control according to the second embodiment of the present invention. In FIG. 10, the same steps as the steps shown in FIG. 8 in the first embodiment will be assigned with the same reference numerals, and the description thereof will be omitted or simplified.

In the routine shown in FIG. 10, if it is determined in step 100 that pre-ignition has occurred, the number of continuous occurrence of pre-ignition is counted for every predetermined representative Pmax at the time of pre-ignition (such as Pmax_1-Pmax_3 shown in FIG. 9) (step 200). When a pre-ignition occurs with a maximum in-cylinder pressure Pmax that is intermediate with respect to the representative Pmax_1-Pmax_3 and the like, the occurrence number concerning the closest representative Pmax may be counted, or the occurrence number concerning each representative Pmax on both sides (for example, Pmax_1 and Pmax_2) may be counted with a predetermined allocation rate.

Next, it is determined whether or not the number of continuous occurrence of pre-ignition concerning any of the aforementioned predetermined Pmax values at the time of pre-ignition (for example, Pmax_1-Pmax_3) has reached the continuous pre-ignition allowable number n (for example, n_1-n_3) (step 202). As a result of this, if the present determination is established, the continuous pre-ignition suppression control (for example, enrichment of air fuel ratio) is executed (step 112).

FIG. 11 is a flowchart representing a control routine executed by the ECU 32 to implement the aforementioned learning control of the continuous pre-ignition allowable number n.

In the routine shown in FIG. 11, first, it is determined whether or not the occurrence frequency of a predetermined high-Pmax pre-ignition (herein, as one example, a pre-ignition in a case in which the Pmax at the time of pre-ignition is Pmax_3 shown in FIG. 9) is higher than or equal to a predetermined value A (step 300). The ECU 32 always performs counting the occurrence number of the aforementioned high-Pmax pre-ignition in a predetermined time period (for example, one month) in order to obtain the aforementioned occurrence frequency. In present step 300, it is judged whether or not the occurrence frequency obtained in this way is higher than or equal to the predetermined value A.

If the determination of aforementioned step 300 is established, the relation of the continuous pre-ignition allowable number n with respect to the Pmax at the time of pre-ignition is corrected so as to increase the continuous pre-ignition allowable number n (for example, n_3) on the high Pmax side (Pmax_3 side) and decrease the continuous pre-ignition allowable number n (for example, n_1) on the low Pmax side (Pmax_1 side) (step 302). For example, the continuous pre-ignition allowable number n_3 corresponding to the Pmax_3 on the high Pmax side is increased and the continuous pre-ignition allowable numbers n_1 and n_2 corresponding to the Pmax_1 and Pmax_2 on the relatively low Pmax side are decreased, as in the case shown in FIG. 9(A).

If, on the other hand, the determination of aforementioned step 300 is not established, it is determined whether or not the occurrence frequency of the aforementioned predetermined high-Pmax pre-ignition is lower than a predetermined value B (that is smaller than predetermined value A) (step 304). As a result of this, if the determination of present step 304 is not established, that is to say, if the occurrence frequency of the aforementioned high-Pmax pre-ignition is a value between the predetermined value A and the predetermined value B, the relation of the continuous pre-ignition allowable number n with respect to the Pmax at the time of pre-ignition is not corrected.

If, on the other hand, the determination of aforementioned step 304 is established, the relation of the continuous pre-ignition allowable number n with respect to the Pmax at the time of pre-ignition is corrected so as to decrease the continuous pre-ignition allowable number n (for example, n_3) on the high Pmax side (Pmax_3 side) and increase the continuous pre-ignition allowable number n (for example, n_1) on the low Pmax side (Pmax_1 side) (step 306). For example, the continuous pre-ignition allowable number n_3 corresponding to the Pmax_3 on the high Pmax side is decreased and the continuous pre-ignition allowable numbers n_1 and n_2 corresponding to the Pmax_1 and Pmax_2 on the relatively low Pmax side are increased, as in the case shown in FIG. 9(B).

According to the routine shown in FIG. 10 described earlier, if continuous pre-ignition has occurred, the continuous pre-ignition suppression control is executed only when the occurrence number of pre-ignition under any of the Pmax values at the time of pre-ignition has reached the continuous pre-ignition allowable number n that is set for every predetermined Pmax at the time of pre-ignition. As already described, the continuous pre-ignition allowable number n is set so as to increase with a decrease in the Pmax at the time of pre-ignition (see FIG. 7). Because of this, when continuous pre-ignition is detected, the aforementioned method of the present routine also can make it more difficult for the continuous pre-ignition suppression control to be executed when the Pmax at the time of pre-ignition is low than when the Pmax at the time of pre-ignition is high.

Even when continuous pre-ignition is detected, this makes it possible to favorably achieve a good balance between the prevention of an excessive increase in the piston temperature T at the time of continuous occurrence of pre-ignition (especially, at the time of continuous occurrence of pre-ignition under a situation in which the Pmax at the time of pre-ignition is high), and the prevention of deterioration of various performances (exhaust emission performance, and the like) of the internal combustion engine 10 as a result of frequent execution of the continuous pre-ignition suppression control at the time of continuous occurrence of pre-ignition with a low Pmax at the time of pre-ignition that is a situation in which the occurrence frequency of pre-ignition is relatively high.

Further, according to the routine shown in FIG. 11 described so far, the learning control of the continuous pre-ignition allowable number n is performed to change each of the continuous pre-ignition allowable numbers n in accordance with the occurrence frequency of pre-ignition during the aforementioned predetermined time period for every predetermined Pmax at the time of pre-ignition. The present learning control is especially suitable for a situation in which piston strength design is made, as a premise, while taking into consideration the degree of cumulative fatigue of the piston 12 due to the combustion heat occurring at the time of pre-ignition, by following a way of thinking of so-called Miner's rule (cumulative fatigue damage law).

Specifically, according to the method of the aforementioned routine, taking, as an example, a case in which the determination of aforementioned step 300 is established, the continuous pre-ignition allowable number n (for, example, n_3) on the high Pmax side (Pmax_3 side) is increased and the continuous pre-ignition allowable number n (for example, n_1) on the low Pmax side (Pmax_1 side) is decreased when the occurrence frequency of a predetermined high-Pmax pre-ignition (for example, a pre-ignition with the Pmax_3) is higher than or equal to the predetermined value A. That is to say, restriction of continuous occurrence of pre-ignition on the low Pmax side is tightened while easing restriction of continuous occurrence of pre-ignition on the high Pmax side. This makes is possible to achieve a good balance on the whole so that fatigue cumulatively accumulated in the piston 12 does not increase as a result of continuous occurrence of pre-ignition, while suppressing frequent execution of the continuous pre-ignition suppression control in response to a continuous occurrence of pre-ignition on the high Pmax side, even when a continuous occurrence of pre-ignition on the high Pmax side is likely to occur due to a difference in an usage state of the internal combustion engine 10 or a difference in the way of driving by the user. Thus, even when it is assumed that continuous pre-ignition will occur, the piston strength can be favorably secured without accompanying an increase in the piston weight for increasing the strength of the piston itself.

In addition, in the reverse case with respect to the aforementioned case (a case in which the determination of aforementioned step 304 is established), restriction of continuous occurrence of pre-ignition on the high Pmax side is tightened while easing restriction of continuous occurrence of pre-ignition on the low Pmax side. This makes is possible to achieve a good balance on the whole so that fatigue cumulatively accumulated in the piston 12 does not increase as a result of continuous occurrence of pre-ignition, while further suppressing frequent execution of the continuous pre-ignition suppression control in response to a continuous occurrence of pre-ignition on the low Pmax side, even when a continuous occurrence of pre-ignition on the high Pmax side is hard to occur due to a difference in an usage state of the internal combustion engine 10 or a difference in the way of driving by the user.

Incidentally, in the learning control of the continuous pre-ignition allowable number n according to the second embodiment, which has been described above, the relation between the continuous pre-ignition allowable number n and the Pmax at the time of pre-ignition is changed in accordance with the result obtained by comparing the occurrence frequency of pre-ignition under a situation in which the Pmax at the time of pre-ignition is high (for example, the Pmax at the time of pre-ignition is Pmax_3) with the predetermined values A and B. However, the representative Pmax values at the time of pre-ignition for judging the occurrence frequency of pre-ignition in the present learning control is not limited to the one described above, and may, for example, be a value on the low Pmax side (such as Pmax_1).

Moreover, in the second embodiment, which has been described above, the relation between the continuous pre-ignition allowable number n and the Pmax at the time of pre-ignition is treated as bearing a first-order proportional relation, as shown in aforementioned FIG. 7. However, the relation between the abnormal combustion allowable number and the maximum in-cylinder pressure value at the time of occurrence of abnormal combustion in the present invention is not limited to the one described above. More specifically, it may, for example, be the one in which the abnormal combustion allowable number is changed along a curved line in accordance with a change in the maximum in-cylinder pressure value, provided that the abnormal combustion allowable number used in a case in which the maximum in-cylinder pressure value at the time of occurrence of abnormal combustion is low is larger than the abnormal combustion allowable number used in a case in which the maximum in-cylinder pressure value at the time of occurrence of abnormal combustion is high. In addition, the correction method for the relation between the abnormal combustion allowable number and the maximum in-cylinder pressure value at the time of occurrence of abnormal combustion also is not limed to the one described above. More specifically, when the occurrence frequency of abnormal combustion is obtained for every maximum in-cylinder pressure value with respect to at least two maximum in-cylinder pressure values during operation of the internal combustion engine, the abnormal combustion allowable number for a certain maximum in-cylinder pressure value may be increased (or decreased) and the abnormal combustion allowable number for another at least one maximum in-cylinder pressure value may be decreased (or increased) in a case in which the occurrence frequency of abnormal combustion at the certain maximum in-cylinder pressure value is higher than or equal to (or is lower than) a predetermined value.

It is noted that in the second embodiment, which has been described above, the ECU 32 performs a series of the aforementioned processing of steps 200, 202 and 112, whereby the "abnormality combustion suppression control adjusting means" according to the first aspect of the present invention is realized.

In addition, in the above described second embodiment, Pmax_3 corresponds to the "certain maximum in-cylinder pressure value" according to the fourth or fifth aspect of the present invention, and Pmax_1 and Pmax_2 correspond to the "another at least one maximum in-cylinder pressure value" according to the fourth or fifth aspect of the present invention. Furthermore, the ECU 32 performs the aforementioned processing of step 302 when the aforementioned determination of step 300 is established, whereby the "first abnormal-combustion-allowable number changing means" according to the fourth aspect of the present invention is realized, and the ECU 32 performs the aforementioned processing of step 306 when the aforementioned determination of step 304 is established, whereby the "second abnormal-combustion-allowable number changing means" according to the fifth aspect of the present invention is realized.

Incidentally, in the above described first and second embodiments, the description has been made with respect to the control that is addressed in a case in which continuous pre-ignition occurs. However, also in a case in which pre-ignition with a frequency that is higher than or equal to a predetermined number has occurred during a predetermined time period (predetermined cycles) (for example, a case in which several pre-ignitions have occurred continuously and then, a pre-ignition occurs again after one normal combustion is performed), the temperature of the piston 12 similarly increases due to occurrence of pre-ignition, even if it is not a case in which continuous pre-ignition has occurred during a plurality of cycles in the same cylinder. Therefore, in the present description, a case in which pre-ignition with a frequency as described above is detected is referred to as a case in which a "substantially continuous" abnormal combustion is detected, and is addressed in the control of the present invention.

Moreover, the first and second embodiments, which have been described above, obtain the in-cylinder pressure P using the output value of the in-cylinder pressure sensor 34, detect pre-ignition on the basis of the in-cylinder pressure P, and calculate the Pmax at the time of pre-ignition. However, the in-cylinder pressure obtaining means according to the present invention is not limited to the one using the aforementioned in-cylinder pressure sensor 34, and may be the one which detects a correlated value of an in-cylinder pressure or predicts an in-cylinder pressure, by using a predetermined sensor. More specifically, for example, the magnitude of in-cylinder pressure may be grasped using a sensor which detects a vibration generated by an internal combustion engine at the time of combustion.

DESCRIPTION OF SYMBOLS 10 internal combustion engine
12 piston
14 combustion chamber
16 intake passage
18 exhaust passage
20 air flow meter
22 turbo supercharger
24 throttle valve
26 fuel injection nozzle
28 spark plug
32 ECU (Electronic Control Unit)
34 in-cylinder pressure sensor
36 crank angle sensor

The invention claimed is:

1. A control apparatus for an internal combustion engine, comprising:
  a controller that is programmed to:
    obtain in-cylinder pressure of an internal combustion engine;
    detect presence or absence of abnormal combustion on a basis of the in-cylinder pressure obtained by the controller; and when continuous or substantially continuous abnormal combustion is detected, increase an abnormal combustion allowable number that is allowed until abnormal combustion suppression control which suppresses abnormal combustion is executed when a maximum in-cylinder pressure value at a time of occurrence of abnormal combustion is low, as compared with when the maximum in-cylinder pressure value at the time of occurrence of abnormal combustion is high, wherein the controller estimates a piston temperature increase amount due to occurrence of abnormal combustion, on a basis of a product of a piston temperature increase rate that is set so as to increase with an increase in the maximum in-cylinder pressure value at the time of occurrence of abnormal combustion and an occurrence number of abnormal combustion, and wherein when continuous or substantially continuous abnormal combustion is detected, the controller adjusts execution of the abnormal combustion suppression control so that a piston temperature calculated on a basis of the piston temperature increase amount estimated by the controller becomes lower than a predetermined allowable temperature.

2. A control apparatus for an internal combustion engine comprising:
a controller that is programmed to:
obtain in-cylinder pressure of an internal combustion engine;
detect presence or absence of abnormal combustion on a basis of the in-cylinder pressure obtained by the controller; and
when continuous or substantially continuous abnormal combustion is detected, increase an abnormal combustion allowable number that is allowed until abnormal combustion suppression control which suppresses abnormal combustion is executed when a maximum in-cylinder pressure value at a time of occurrence of abnormal combustion is low, as compared with when the maximum in-cylinder pressure value at the time of occurrence of abnormal combustion is high,
wherein the controller executes the abnormal combustion suppression control in a case in which an occurrence number of abnormal combustion when continuous or substantially continuous abnormal combustion is detected has reached the abnormal combustion allowable number,
wherein the abnormal combustion allowable number differs according to the maximum in-cylinder pressure value at the time of occurrence of abnormal combustion, and
when the abnormal combustion allowable number that is used when the maximum in-cylinder pressure value at the time of occurrence of abnormal combustion is low is larger than the abnormal combustion allowable number that is used when the maximum in-cylinder pressure value at the time of occurrence of abnormal combustion is high,
wherein when an occurrence frequency of abnormal combustion is obtained for every maximum in-cylinder pressure value with respect to at least two maximum in-cylinder pressure values during operation of the internal combustion engine, the controller increases the abnormal combustion allowable number for a certain maximum in-cylinder pressure value while decreasing the abnormal combustion allowable number for another at least one maximum in-cylinder pressure value in a case in which the occurrence frequency of abnormal combustion at the certain maximum in-cylinder pressure value is higher than or equal to a first predetermined value.

3. A control apparatus for an internal combustion engine comprising:
a controller that is programmed to:
obtain in-cylinder pressure of an internal combustion engine;
detect presence or absence of abnormal combustion on a basis of the in-cylinder pressure obtained by the controller; and
when continuous or substantially continuous abnormal combustion is detected, increase an abnormal combustion allowable number that is allowed until abnormal combustion suppression control which suppresses abnormal combustion is executed when a maximum in-cylinder pressure value at a time of occurrence of abnormal combustion is low, as compared with when the maximum in-cylinder pressure value at the time of occurrence of abnormal combustion is high,
wherein the controller executes the abnormal combustion suppression control in a case in which an occurrence number of abnormal combustion when continuous or substantially continuous abnormal combustion is detected has reached the abnormal combustion allowable number,
wherein the abnormal combustion allowable number differs according to the maximum in-cylinder pressure value at the time of occurrence of abnormal combustion, and
when the abnormal combustion allowable number that is used when the maximum in-cylinder pressure value at the time of occurrence of abnormal combustion is low is larger than the abnormal combustion allowable number that is used when the maximum in-cylinder pressure value at the time of occurrence of abnormal combustion is high,
wherein when an occurrence frequency of abnormal combustion is obtained for every maximum in-cylinder pressure value with respect to at least two maximum in-cylinder pressure values during operation of the internal combustion engine, the controller decreases the abnormal combustion allowable number for a certain maximum in-cylinder pressure value while increasing the abnormal combustion allowable number for another at least one maximum in-cylinder pressure value in a case in which the occurrence frequency of abnormal combustion at the certain maximum in-cylinder pressure value is lower than a second predetermined value.

4. A control apparatus for an internal combustion engine, comprising:
in-cylinder pressure obtaining means for obtaining in-cylinder pressure of an internal combustion engine;
abnormal combustion detection means for detecting presence or absence of abnormal combustion on a basis of the in-cylinder pressure obtained by the in-cylinder pressure obtaining means; and
abnormality combustion suppression control adjusting means for, when continuous or substantially continuous abnormal combustion is detected, increasing an abnormal combustion allowable number that is allowed until abnormal combustion suppression control which suppresses abnormal combustion is executed when a maximum in-cylinder pressure value at a time of occurrence of abnormal combustion is low, as compared with when the maximum in-cylinder pressure value at the time of occurrence of abnormal combustion is high, wherein the abnormal combustion suppression control adjusting means piston temperature increase amount estimating means for estimating a piston temperature increase amount due to occurrence of abnormal combustion, on a basis of a product of a piston temperature increase rate that is set so as to increase with an increase in the maximum in-cylinder pressure value at the time of occurrence of abnormal combustion and an occurrence number of abnormal combustion, and wherein when continuous or substantially continuous abnormal combustion is detected, the abnormal combustion suppression control adjusting means adjusts execution of the abnormal combustion suppression control so that a piston temperature calculated on a basis of the piston temperature increase amount estimated by the piston temperature increase amount estimating means becomes lower than a predetermined allowable temperature.

\* \* \* \* \*